US010612909B2

(12) United States Patent
Hanan et al.

(10) Patent No.: US 10,612,909 B2
(45) Date of Patent: Apr. 7, 2020

(54) SYSTEMS AND METHODS FOR OPTICAL MEASUREMENT OF CONTAINER WALL THICKNESS

(71) Applicant: Niagara Bottling, LLC., Ontario, CA (US)

(72) Inventors: Jay Clarke Hanan, Ontario, CA (US); Alexander Telemachos Mouschovias, Ontario, CA (US); Shih-Chieh "Jerry" Hsiung, New Taipei (TW)

(73) Assignee: Niagara Bottling, LLC, Ontario (CA)

( * ) Notice: Subject to any disclaimer, the term of this patent is extended or adjusted under 35 U.S.C. 154(b) by 52 days.

(21) Appl. No.: 15/586,142

(22) Filed: May 3, 2017

(65) Prior Publication Data

US 2017/0322018 A1 Nov. 9, 2017

Related U.S. Application Data

(60) Provisional application No. 62/331,304, filed on May 3, 2016.

(51) Int. Cl.
*G01B 11/06* (2006.01)
*G06T 7/00* (2017.01)
(Continued)

(52) U.S. Cl.
CPC ...... *G01B 11/0691* (2013.01); *G01B 11/0625* (2013.01); *G01B 11/0633* (2013.01);
(Continued)

(58) Field of Classification Search
CPC ...... G01B 11/0691; H04N 5/33; G06T 7/001; G06T 2207/10048; G06T 2207/20221;
(Continued)

(56) References Cited

U.S. PATENT DOCUMENTS 6,118,526 A 9/2000 Hidalgo et al.
6,967,716 B1 11/2005 Cochran et al.
(Continued)

OTHER PUBLICATIONS

International Search Report dated Sep. 12, 2017.

*Primary Examiner* — Hee-Yong Kim
(74) *Attorney, Agent, or Firm* — Rutan & Tucker LLP; Hani Z. Sayed (57) ABSTRACT

Systems and methods are provided for determining a thickness of a material or an article of manufacture thereof such as a wall thickness of a plastic container or plastic bottle during manufacturing. In some embodiments, for example, a measurement system can include a light source disposed adjacent to a production line for plastic bottles. The light source can be configured to transmit light of a known frequency through the plastic bottles. A camera can be disposed opposite the light source. The camera can be configured to receive the light transmitted through the plastic bottles. An optional trigger, when present, can be configured to coordinate timing of the camera and the light source. A computer can be configured to determine wall thicknesses for the plastic bottles by an experimentally determined correlation between the light received by the camera and a known absorbance spectrum of the material forming the plastic bottles.

15 Claims, 4 Drawing Sheets

(51) Int. Cl.
  *G01N 21/59* (2006.01)
  *H04N 5/33* (2006.01)
  *G01N 21/90* (2006.01)

(52) U.S. Cl.
  CPC ......... *G01N 21/59* (2013.01); *G01N 21/9081* (2013.01); *G06T 7/001* (2013.01); *G01N 2201/062* (2013.01); *G01N 2201/06113* (2013.01); *G06T 2207/10048* (2013.01); *G06T 2207/20221* (2013.01); *H04N 5/33* (2013.01)

(58) Field of Classification Search
  CPC ......... G01N 21/59; G01N 2201/06113; G01N 2201/062
  USPC .......................................................... 348/92
  See application file for complete search history.

(56) References Cited

U.S. PATENT DOCUMENTS

| | | | |
|---|---|---|---|
| 2004/0024560 A1 | 2/2004 | Shelby et al. | |
| 2005/0231718 A1* | 10/2005 | Goodall | G01N 21/0303 356/344 |
| 2006/0214321 A1* | 9/2006 | Semersky | B29O 49/78 264/40.1 |
| 2009/0278286 A1 | 11/2009 | Schmidt et al. | |
| 2012/0229618 A1* | 9/2012 | Urano | G01N 21/9501 348/92 |

* cited by examiner

SYSTEMS AND METHODS FOR OPTICAL MEASUREMENT OF CONTAINER WALL THICKNESS

CROSS-REFERENCE

This application claims the benefit of U.S. Provisional Patent Application No. 62/331,304, filed May 3, 2016, which is hereby incorporated by reference herein in its entirety.

FIELD

The field of the systems and methods provided herein generally relates to plastic containers. More particularly, the field of the systems and methods provided herein relates to high-speed measurements to determine wall thicknesses of containers moving at speeds encountered during manufacturing.

BACKGROUND

Plastic containers have been used as a replacement for glass or metal containers in the packaging of beverages for several decades. The most common plastic used in making beverage containers today is polyethylene terephthalate (PET). Containers made of PET are transparent, thin-walled, and resistant to deformation by forces exerted on walls of the container by opposing forces of contents packaged in the containers. PET resins are also reasonably priced and easy to process. PET bottles are generally made by a process that includes blow-molding of plastic pre-forms made by injection molding of the PET resin.

Knowledge of material thickness is beneficial in a production of containers, such as PET bottles, for a multitude of reasons, typically including process and quality control. As will be recognized, knowing the thickness of the material of the containers is critical for limiting unneeded material being included in the containers, thereby conserving material resources and limiting production expenditures.

Some conventional solutions for measuring container wall thickness are capable of measuring with an accuracy of 1 micron (μm), but these solutions lose their accuracy at speeds typically involved in the manufacturing of the containers. Although some conventional systems are capable of higher speed measurements, the accuracy of such high-speed systems generally is about 20 μm, and the systems are capable of capturing relatively fewer data points from each container than is desired. Further, conventional high-speed systems generally can only measure a relatively small number of discrete points or regions on a container.

What is needed, therefore, are high-speed measurement systems and methods capable of accurately determining container wall thicknesses, potentially of an entirety of each container, while the containers move at speeds encountered during the manufacturing process.

SUMMARY

Provided herein is a system including, in some embodiments, a light source, a detector, an optional trigger, and a dedicated computer system configured for determining a thickness of a material or an article of manufacture thereof such as wall thickness of a plastic container or plastic bottle. The light source can be configured to emit light in a band of wavelengths known to be absorbed by the material. The detector can be oppositely oriented to the light source, and the detector can be configured to detect light transmitted through the material or the article of manufacture. The optional trigger, when present, can be configured to coordinate light emission and detection between the light source and the detector. The dedicated computer system can include instructions stored in a memory of the computer system and one or more processors. The one or more processors can be configured to execute the instructions to determine the thickness of the material or the article of manufacture from light transmitted through the material or the article of manufacture and received by the detector in accordance with a known relationship of absorbance to thickness for the material or the article of manufacture. The one or more processors can be further configured to execute the instructions to return thickness data and thickness trend analyses for the material or the article of manufacture during manufacturing thereof.

Also provided herein is a method including, in some embodiments, directing light to a material or an article of manufacture thereof such as a plastic container or plastic bottle, receiving light transmitted through the material or the article of manufacture, identifying a correlation between the light transmitted and the thickness of the material or the article of manufacture, and monitoring the thickness of the material or the article of manufacture during manufacturing thereof. Directing light to the containers can include directing light of at least one selected frequency from one or more light sources to the material or the article of manufacture thereof. A first portion of the light can be absorbed by the material, and a second portion of the light can be transmitted through the material. Receiving light transmitted through the material or the article of manufacture thereof can include receiving the second portion of the light with a camera configured to receive the at least one selected frequency. Identifying a correlation between the light transmitted and the thickness of the material or the article of manufacture can include identifying a correlation between the second portion of the light and the thickness of the material or the article of manufacture. Monitoring the thickness of the material or the article of manufacture can include monitoring the thickness of the material or the article of manufacture by way of the correlation to obtain real-time feedback. The real-time feedback can be used to inform and, for example, control a quantity of the material in the articles of manufacture.

DRAWINGS

The drawings refer to embodiments of the present disclosure in which.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first camera," may be made. However, the specific numeric reference should not be interpreted as a literal sequential order but rather interpreted that the "first camera" is different than a "second camera." Thus, the specific details set forth are merely examples. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for a measurement system to determine container wall thicknesses of a multiplicity of containers during manufacturing of the containers. The measurement system includes one or more light sources disposed adjacent to a production line conveying the multiplicity of containers during manufacturing. The light sources are configured to transmit light of at least one known frequency through the containers. At least one camera is disposed adjacent to the production line and opposite of the one or more light sources. The at least one camera is configured to receive the light transmitted through the containers. An optional trigger, when present, is configured to coordinate the timing of at least one of the camera and the light sources. When not present, or when the trigger is not active, the light sources can be configured to continuously emit light. A computer is configured to determine the container wall thicknesses by way of a correlation between the light received by the camera and a known absorbance spectrum of the material of the multiplicity of containers. In some embodiments, the correlation includes one or more algorithms that are executable by way of instructions stored on a memory of the computer. The one or more algorithms are configured to relate the light received by the camera and an absorbed portion of the transmitted light and then return a corresponding wall thickness of the multiplicity of containers based on the known absorbance spectrum of the material. It should be understood that the purpose of the present invention is to measure and determine container wall thickness on a multiplicity of containers during the manufacturing of the containers.

Although in one embodiment at least one camera may be utilized, it should be understood that a camera and/or a plurality of cameras are not needed to determine the wall thickness. In this alternative embodiment, a light source may still be configured to transmit a light of at least a known frequency through the container and the alteration of the frequency through the container may be processed by a computer to determine the thickness based on frequency response and alterations to same.

Figure 1:
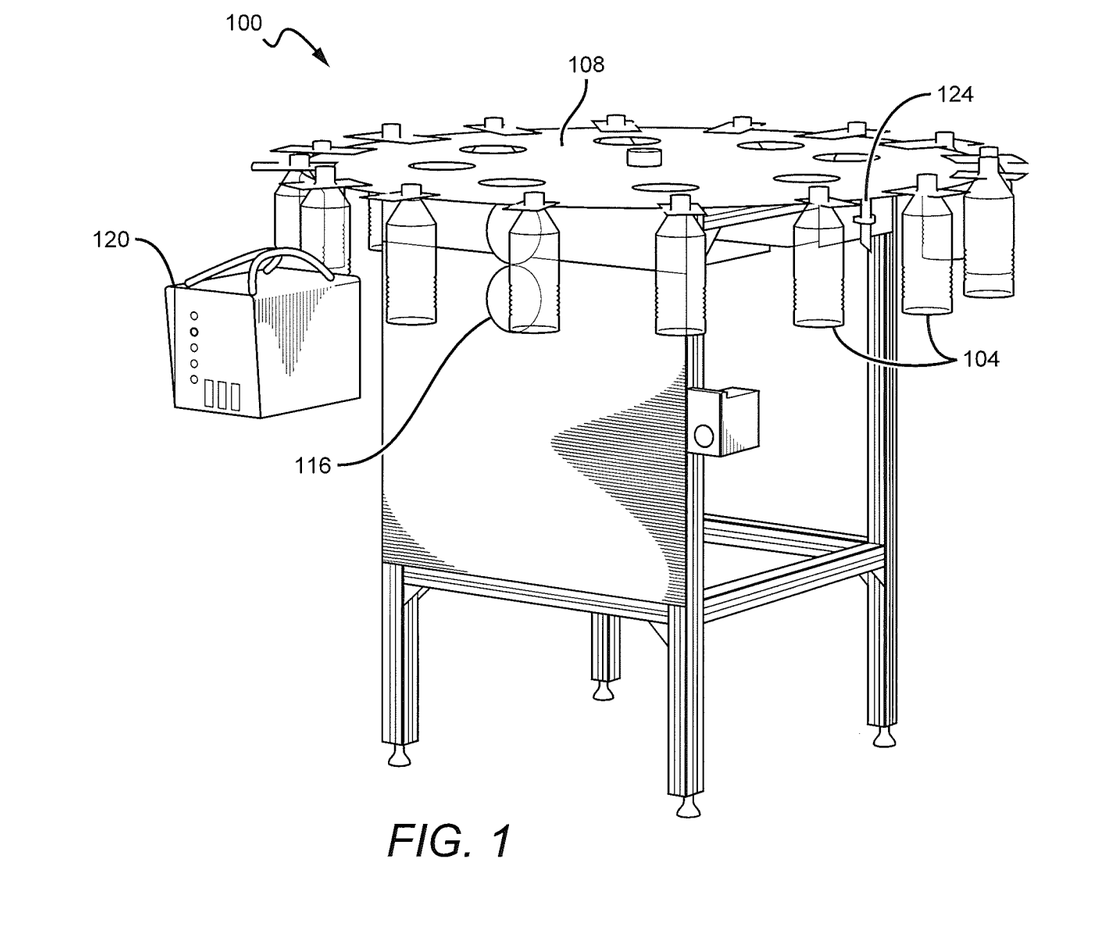
FIG. 1 illustrates a perspective view of an embodiment of a high-speed optical measurement system for determining container wall thicknesses during manufacturing of the containers.

FIG. 1 illustrates a perspective view of an embodiment of a high-speed optical measurement system 100 for determining container wall thicknesses of a multiplicity of containers 104 during manufacturing. In the embodiment illustrated in FIG. 1, the containers 104 are supported and moved by way of a turntable 108. It should be understood that the turntable 108 serves to represent an embodiment of a production line environment whereby the containers 104, after having been fabricated, may be measured for wall thickness while being rapidly moved along the production line.

The high-speed optical measuring system 100 includes one or more light sources 116 that are mounted nearby the passing containers 104. The light sources 116 are configured to transmit light of at least one known frequency through the multiplicity of containers 104 as they pass by the light sources 116. In some embodiments, the light sources 116 include light emitting diodes (LEDs) configured to transmit one or more known frequencies of light through the containers 104. The light sources 116 may include any suitable optical source, including, but not necessarily limited to, one or more lamps, lasers, infrared sources, as well as combinations of different types of light sources. Particularly suitable light sources 116 include LEDs and lasers due to their narrow optical bandwidths. Further, in some embodiments, one or more optical reflectors or diffusers may be coupled with the light sources 116 so as to spread out the transmitted light, thereby reducing the number of the light sources 116 required to achieve an optimal coverage of the containers 104.

During production run-time, the containers 104 pass through the light transmitted by the light sources 116. The material of each of the containers 104 absorbs a portion of the light, and a remaining portion of the light passes through the containers 104 to a detector such as a photodetector, a thermal detector, a camera, or the like. A camera 120 positioned across the production line, opposite of the light sources 116, may be configured to receive the remaining portion of the light. An optional trigger 124, when present, may be coupled with the high-speed measurement system 100 and used to coordinate the timing of the camera 120 with the motion of the containers 104 along the production line. In some embodiments, the trigger 124 may be used to coordinate the timing of the light sources 116 and the camera 120 with the motion of the containers 104. The trigger 124 can be further configured to coordinate a timing of the camera 120 and at least two light sources of the light sources 116 configured to emit light at two different known frequencies. The camera 120 can be configured to image the containers under the at least two different known frequencies for different, superimposable images, from which the computer system can be further configured to superimpose the images and determine the wall thicknesses of the containers by differences by the superimposed images.

Further, it is contemplated that at least one of the light sources 116 may be a calibration light or include a calibration light (e.g., part of a bulb such as a separate filament) that is oriented to transmit light directly to the camera 120 without passing through the containers 104. It will be appreciated that the calibration light may be used to calibrate measurements so as to compensate for variations in temperature, dirt on the lens, and any other adverse external inconsistencies that may arise during operation of the high-speed measurement system 100, or encountered during manufacturing of the containers 104.

Figure 2:
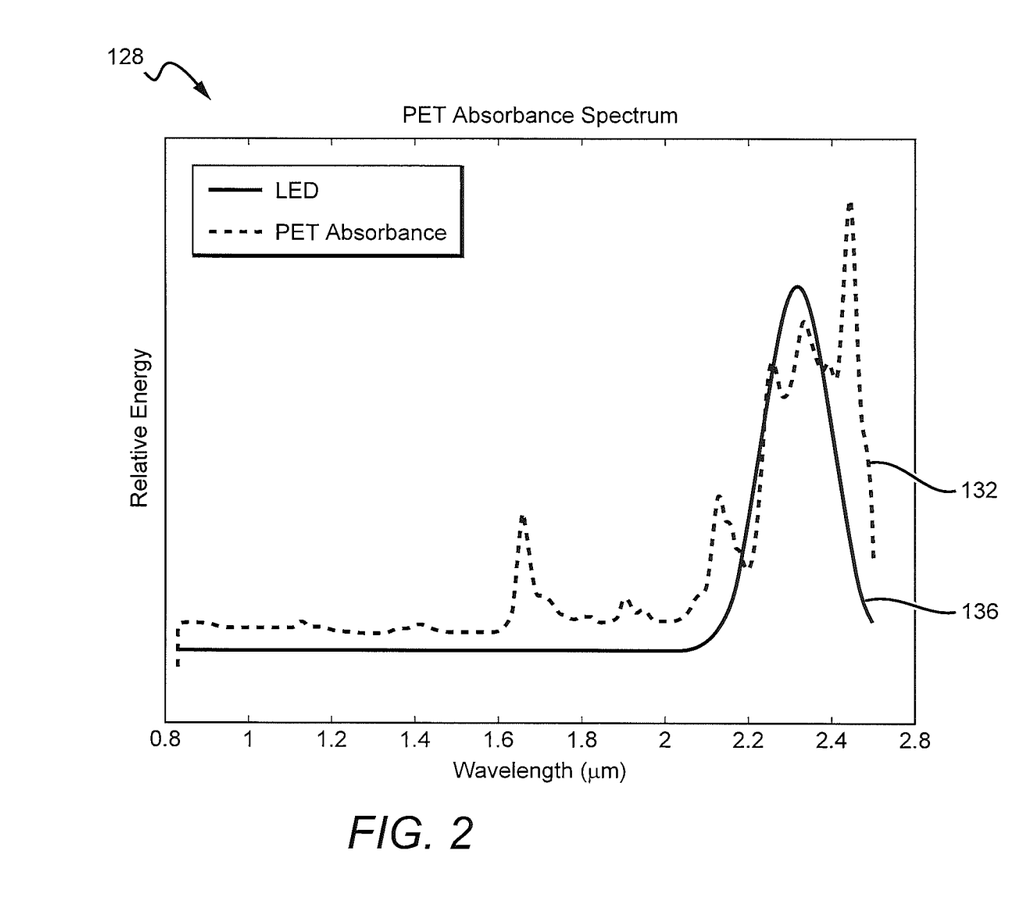
FIG. 2 is a graph illustrating an absorbance spectrum of polyethylene terephthalate (PET) as a function of wavelength of incident light.

FIG. 2 is a graph 128 illustrating an absorbance spectrum of polyethylene terephthalate (PET) 132 as a function of wavelength of incident light. As will be appreciated, the absorbance spectrum of polyethylene terephthalate is provided as an example of an absorbance spectrum for a material for which systems and methods provided herein can be configured to determine thicknesses. It should be understood the material can be, for example, any sufficiently transparent plastic for transmitting light, which can be a function of thickness itself. The plastic can be selected from, but is not limited to, polyethylene (e.g., polyethylene terephthalate), polyvinyl chloride (PVC), and polypropylene.

The camera 120 may be tuned to receive the one or more known frequencies of light, and an absorbed portion of the light by the material of the containers 104 may be determined. The thickness of the containers 104 may then be computed based on the absorbed portion of that light. As will be appreciated, the computation of the absorbed portion of the light and the wall thickness of the containers 104 may be performed by way of suitable hardware components or a multiplicity of instructions stored on a non-transitory machine readable medium (i.e., a memory) of a computer. The computer preferably includes one or more processors that are configured to execute the instructions so as to determine the wall thickness of the containers 104. The computer can be a dedicated computer with specialized hardware added thereto such as the trigger 124, one or more detectors (e.g., photodetectors, thermal detectors, cameras such as the camera 120, etc.), the one or more light sources, or the like with connecting componentry and specific instructions for effecting thickness determinations as described herein. The computer can also include embedded systems or one or more microcontrollers to control the foregoing specialized hardware and connecting componentry for effecting thickness determinations as described herein In addition to the absorbance spectrum of PET 132, the graph 128 shows an emission spectrum 136 of a specific LED that was chosen for testing the high-speed measurement system 100. As will be appreciated, the graph 128 indicates that an emission spectrum of the light sources 116 may be selected so as to overlap with the absorption spectrum of the container material, such as PET, so as to ensure a larger portion of the light is absorbed, thereby enabling a relatively more accurate thickness measurement. Further, it is contemplated that in those embodiments including multiple lights sources of different frequencies, at least one, but not all, of the frequencies may be advantageously selected within an absorbing band of the material forming the walls of the container 104.

As mentioned above, multiple light sources 116 may be incorporated into the high-speed measurement system 100, without limitation. In some embodiments, the light sources 116 may include multiple optical sources of different frequencies, thereby facilitating a comparison of the absorption of each of the frequencies and providing a relatively stronger correlation between wall thickness of the containers 104 and the absorption of light by the material of the containers. It is contemplated that the multiple light sources 116 may be spaced apart along the direction of motion of the containers 104 on the production line. Each of the multiple light sources 116 may be pulsed for a fraction of an integration time of the camera 120. It is envisioned that the duration of the integration time of the camera 120 may be selected such that a controlled "motion blur" of each container is detected by the camera. Thus, each of the multiple light sources 116 may illuminate the same section of the container 104 in a different portion of a frame of the camera 120.

Figure 3:
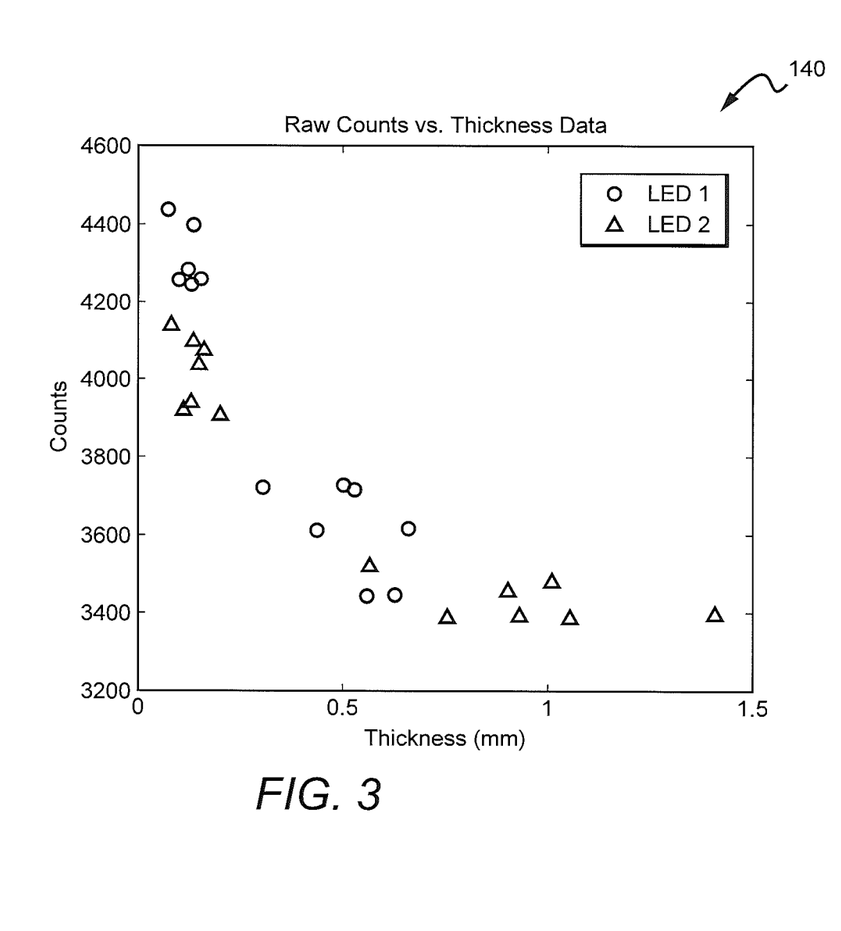
FIG. 3 is a graph illustrating a correlation between an amount of unabsorbed light detected and container wall thickness measured at discrete points on the container.
Figure 4:
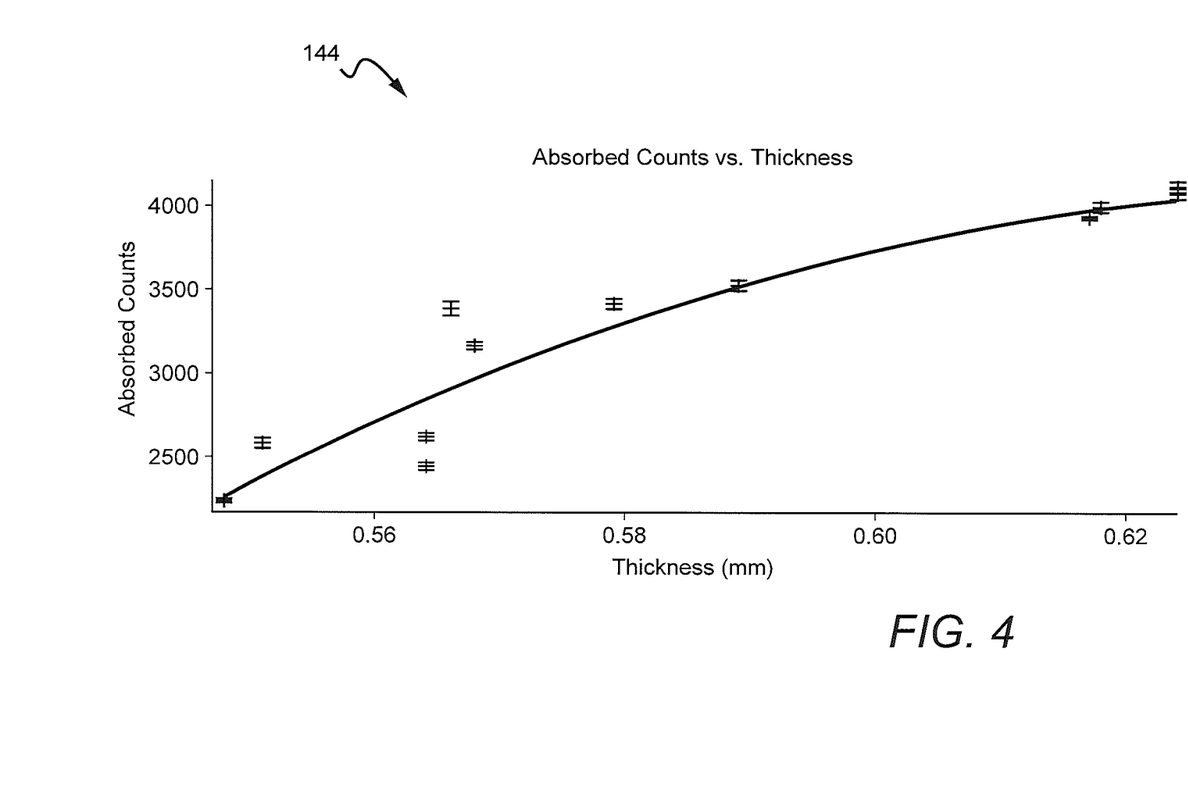
FIG. 4 is a graph illustrating a correlation between an amount of absorbed light and a container wall thickness measured at discrete points on the container.

Experimental observation has demonstrated that a clear correlation exists between an amount of light absorbed by PET and the thickness of the walls of the containers 104. For example, a graph 140 illustrated in FIG. 3 shows a correlation between an amount of unabsorbed or transmitted light detected and container wall thickness measured at discrete points on the container. Further, a graph 144 illustrated in FIG. 4 shows an experimental correlation between an amount of light absorbed by the material forming the containers and container wall thickness measured at discrete points on the container.

Moreover, experiment observation has shown that a correlation exists between the thickness of the containers 104 and a rate of heat absorption and heat emission of the containers. As such, it is contemplated that in some embodiments, the camera 120 may include a first thermal camera and a second thermal camera, both configured to measure heat emission and positioned at different locations along the production line of containers 104. The different locations can optionally differ in temperature due to a difference in ambient temperature at the different locations, a temperature resulting from heating or cooling the different locations, or a combination thereof. For example, the first thermal camera may be positioned at the site of an application of heat to the containers 104 and may measure a temperature of the containers 104 due to the application of the heat. The temperature measurements may be in the form of a thermal image. The second thermal camera may perform a second temperature measurement after cooling of the containers 104 to a sufficient degree to detect a useable difference in the resulting thermal images for the purpose of determining the wall thicknesses of the containers. The difference between the first and second temperature measurements may then be used to compute a corresponding wall thickness of the containers 104. It should be understood that any of various optical or thermal sources may be arranged into a variety of different configurations and may be used to compute corresponding wall thicknesses of the containers 104, without limitation.

It is contemplated that the computed wall thickness of the containers 104 may be utilized as a direct real-time feedback to one or more algorithms that are configured to control the quantity of material in the walls of the containers 104. For example, inputs from the production system, such as preform temperature, pre-blow pressure and timing, intermediate and final blow pressure, as well as other control variables may be used to maintain a desired wall thickness distribution within the production line based on the direct real-time feedback received by way of the high-speed measurement system 100.

In some embodiments, software may be used to facilitate the algorithms discussed herein and may be embodied onto a non-transitory machine-readable medium. A machine-readable medium includes any mechanism that stores information in a form readable by a machine (e.g., a computer). For example, a machine-readable medium includes read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C+, C++, C #, Java, Python, php, .NET, JavaScript, UNIX Script, SQL, PL/SQL, or other similar languages. Also, an algorithm may be implemented with lines of code in software, configured logic gates in hardware, or a combination of both. In an embodiment, the logic consists of electronic circuits that follow the rules of Boolean Logic, software that contains patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it should be appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

In view of the foregoing, a measurement system is provided for determining container wall thicknesses of containers manufactured on a production line including, in some embodiments, one or more light sources, one or more cameras, and a dedicated computer system. The one or more light sources can be configured to emit light of one or more known frequencies, and the one or more light sources can be oriented to direct the light through the containers. The one or more cameras can be oppositely oriented to the one or more light sources, and the one or more cameras can be configured to receive light transmitted through the containers. The dedicated computer system can be configured for determining the wall thicknesses of the containers by correlating the light transmitted through the containers and received by the one or more cameras with a known absorbance spectrum of a material of the containers.

In such embodiments, the one or more lights can wholly or partially include at least one calibration light oppositely oriented to at least one camera of the one or more cameras, wherein the at least one calibration light can be configured to emit light without directing the light through the containers. The computer system can be further configured for calibrating measurements by the measurement system with the at least one calibration light.

In such embodiments, the one or more light sources can include one or more lamps, lasers, light emitting diodes (LEDs), infrared sources, or a combination thereof configured to emit the light of one or more known frequencies. For example, the one or more light sources can include one or more LEDs, or the one or more light sources can include one or more lasers.

In such embodiments, the system further can further include one or more optical reflectors or diffusers coupled with the one or more light sources. The one or more optical reflectors can be configured to spread out the light emitted by the one or more light sources to provide optimal light coverage of the containers.

In such embodiments, the system further can further include a trigger configured to coordinate a timing of at least one camera of the one or more cameras and at least one light source of the one or more light sources. The trigger can include suitable hardware components coupled to the computer system. The computer system can include instructions stored in a memory of the computer system, and one or more processors can be configured to execute the instructions to activate the trigger or the hardware components thereof.

In such embodiments, the trigger can be further configured to coordinate the timing of the at least one camera and at least two light sources of the one or more light sources configured to emit light at two different known frequencies. The at least one camera can be configured to image the containers under the at least two different known frequencies for different, superimposable images, from which the computer system can be further configured to superimpose the images and determine the wall thicknesses of the containers by differences by the superimposed images.

In such embodiments, the measurement system can be configured for determining the container wall thicknesses of plastic containers. The plastic of the plastic containers can be selected from polyethylene, polyethylene terephthalate (PET), polyvinyl chloride (PVC), and polypropylene.

In such embodiments, the computer system can be further configured for determining the container wall thicknesses by correlating the light transmitted through the containers and subsequently received by the one or more cameras with a known absorbance spectrum of a material of the containers over a range of wavelengths that the material is known to absorb light based upon the absorbance spectrum of the material. The computer system can be further configured for returning the wall thicknesses of the containers, as well as providing wall-thickness trend analyses for the containers.

In such embodiments, the one or more cameras can include at least a first thermal camera and a second thermal camera. Each thermal camera of at least the first thermal camera and the second thermal cameras can be configured to thermally image the containers at different locations along the production line. The different locations can optionally differ in temperature due to a difference in ambient temperature at the different locations, a temperature resulting from heating or cooling the different locations, or a combination thereof. The system can further include a heat source configured for applying heat to the containers at a wavelength absorbed by a material of the containers. The first thermal camera can be positioned to thermally image the containers subsequent to the heat source applying heat to the containers. The second thermal camera can be positioned to thermally image the containers subsequent to the first thermal camera, as well as subsequent to cooling of the containers to a sufficient degree to detect a useable difference in the resulting thermal images for the purpose of determining the wall thicknesses of the containers. The computer system can further be configured for determining the wall thicknesses of the containers by differences in the resulting thermal images provided by the first and second thermal cameras in accordance with a known relationship between heat dissipation and the wall thickness of the containers.

Also in view of the foregoing, a system is provided including, in some embodiments, a light source, a detector, an optional trigger, and a dedicated computer system. The light source can be configured to emit light in a band of wavelengths known to be absorbed by polyethylene terephthalate (PET). Such a light source can be an LED. The detector can be oppositely oriented to the light source, and the detector can be configured to detect light transmitted through PET containers on a production line. The optional trigger, when present, can be configured to coordinate light emission and detection between the light source and the detector. The dedicated computer system can include instructions stored in a memory of the computer system and one or more processors. The one or more processors can be configured to execute the instructions to determine wall thicknesses of the PET containers from light transmitted through the PET containers and received by the detector in accordance with a known relationship of absorbance to thickness for the PET containers. The one or more processors can be further configured to execute the instructions to return wall-thickness data and wall-thickness trend analyses for the PET containers.

Also in view of the foregoing, a method is provided for determining container wall thicknesses of containers manufactured on a production line including, in some embodiments, directing light to the containers, receiving light transmitted through the containers, identifying a correlation between the light transmitted and the container wall thicknesses, and monitoring the container wall thicknesses of the containers. Directing light to the containers can include directing light of at least one selected frequency from one or more light sources to the containers. A first portion of the light can be absorbed by a material of the containers, and a second portion of the light can be transmitted through the containers. Receiving light transmitted through the containers can include receiving the second portion of the light with a camera configured to receive the at least one selected frequency. Identifying a correlation between the light transmitted and the container wall thicknesses can include identifying a correlation between the second portion of the light and the container wall thicknesses. Monitoring the container wall thicknesses of the containers can include monitoring the container wall thicknesses of the containers by way of the correlation to obtain real-time feedback. The real-time feedback can be used to inform and, thus, control a quantity of the material in the containers.

In such embodiments, the method can further include mounting one or more light sources about the production line and orienting the one or more light sources for directing the light to the containers as each of the containers is conveyed on the production line.

In such embodiments, directing the light further can further include orienting at least one light source of the one or more light sources to emit light directly toward the camera without interference by the containers. The at least one light source of the one or more light sources can be a calibration light configured for calibration measurements.

In such embodiments, the method can further include coordinating a timing of any of the one or more light sources and the camera with the containers as each of the containers is conveyed on the production line.

In such embodiments, the method can further include a light source that may still be configured to transmit a light of at least a known frequency through the container and the alteration of the frequency through the container may be processed by a computer to determine the thickness based on frequency response and alterations to same In such embodiments, the method can further include selecting the at least one selected frequency of the one or more light sources to overlap at least one known absorbing frequency from an absorbance spectrum of the material where a relatively large portion of the light is absorbed by the material, thereby enabling a relatively more accurate measurement of the wall thicknesses of the containers.

In such embodiments, identifying the correlation can include comparing an absorption of multiple optical frequencies to provide a relatively stronger correlation between the wall thicknesses of the containers and an absorption of the light by the material of the containers.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A measurement system for determining container wall thicknesses of containers manufactured on a production line, comprising:
   one or more light sources configured to emit light of one or more known frequencies and oriented to direct the light through the containers, wherein each of the one or more light sources may be pulsed for an integration time;
   one or more cameras oppositely oriented to the one or more light sources, the one or more cameras configured to receive light transmitted through the containers;
   a trigger configured to coordinate timing of the one or more cameras with i) the motion of the containers along the production line and ii) at least two light sources configured to emit light at two different known frequencies;
and
   a dedicated computer system configured for determining the wall thicknesses of the containers by correlating the light transmitted through the containers and received by the one or more cameras with a known absorbance spectrum of a material of the containers, wherein the determined wall thickness may be utilized as a real-time input in conjunction with one more control variables comprising preform temperature, such that one or more algorithms are configured to control a material quantity with respect to container walls.

2. The measurement system of claim 1,
   wherein the one or more lights wholly or partially includes at least one calibration light oppositely oriented to at least one camera of the one or more cameras configured to emit light without directing the light through the containers,
   wherein the computer system is further configured for calibrating measurements by the measurement system with the at least one calibration light.

3. The measurement system of claim 1,
   wherein the one or more light sources include one or more lamps, lasers, light emitting diodes (LEDs), infrared sources, or a combination thereof configured to emit the light of one or more known frequencies.

4. The measurement system of claim 3, wherein the one or more light sources include one or more LEDs.

5. The measurement system of claim 3, wherein the one or more light sources include one or more lasers.

6. The measurement system of claim 1, further comprising:
one or more optical reflectors or diffusers coupled with the one or more light sources configured to spread out the light emitted by the one or more light sources to provide optimal coverage of the containers.

7. The measurement system of claim 1, further comprising:
wherein the trigger includes suitable hardware components coupled to the computer system, and
wherein the computer system includes instructions stored in a memory of the computer system and one or more processors configured to execute the instructions to activate the trigger.

8. The measurement system of claim 1, wherein the at least one camera is configured to image the containers under the at least two different known frequencies for different, superimposable images, from which the computer system is further configured to superimpose the images and determine the wall thicknesses of the containers by differences by the superimposed images.

9. The measurement system of claim 1, wherein the measurement system is configured for determining the container wall thicknesses of plastic containers,
wherein the plastic is selected from polyethylene, polyethylene terephthalate (PET), polyvinyl chloride (PVC), and polypropylene.

10. The measurement system of claim 1, wherein the computer system is further configured for determining the wall thicknesses of the containers by correlating the light transmitted through the containers and received by the one or more cameras with a known absorbance spectrum of a material of the containers over a range of wavelengths the material is known to absorb light based upon the absorbance spectrum of the material.

11. The measurement system of claim 10, wherein the computer system is further configured for returning the wall thicknesses of the containers and providing wall-thickness trend analyses for the containers.

12. The measurement system of claim 1,
wherein the one or more cameras include at least a first thermal camera and a second thermal camera,
wherein each thermal camera of at least the first thermal camera and the second thermal camera is configured to thermally image the containers at different locations along the production line, the different locations optionally differing in temperature due to a difference in ambient temperature, a temperature resulting from heating or cooling, or a combination thereof.

13. The measurement system of claim 12,
wherein the computer system is further configured for determining the wall thicknesses of the containers by differences in thermal images provided by the first and second thermal cameras in accordance with a known relationship between heat dissipation and the wall thickness of the containers.

14. The measurement system of claim 12, further comprising:
a heat source configured for applying heat to the containers at a wavelength absorbed by a material of the containers,
wherein the first thermal camera is positioned to thermally image the containers subsequent to the heat source applying heat to the containers, and
wherein the second thermal camera is positioned to thermally image the containers subsequent to the first thermal camera and cooling of the containers.

15. The measurement system of claim 13,
wherein the computer system is further configured for determining the wall thicknesses of the containers by differences in thermal images provided by the first and second thermal cameras in accordance with a known relationship between heat dissipation and the wall thickness of the containers.

* * * * *